United States Patent
Frantz et al.

(10) Patent No.: US 9,845,596 B2
(45) Date of Patent: Dec. 19, 2017

(54) CEILING SYSTEM

(71) Applicant: ARMSTRONG WORLD INDUSTRIES, INC., Lancaster, PA (US)

(72) Inventors: William H. Frantz, Elizabethtown, PA (US); Gourish Sirdeshpande, Lancaster, PA (US); Peter J. Oleske, Lancaster, PA (US); Jere W. Myers, Washington Boro, PA (US); Kenneth P. Roy, Holtwood, PA (US); Anthony L. Wiker, Lancaster, PA (US); Shannon M. Weir, York, PA (US)

(73) Assignee: AWI Licensing LLC, Wilmington, DE (US)

( * ) Notice: Subject to any disclaimer, the term of this patent is extended or adjusted under 35 U.S.C. 154(b) by 65 days.

(21) Appl. No.: 14/868,485

(22) Filed: Sep. 29, 2015

(65) Prior Publication Data
US 2017/0089064 A1    Mar. 30, 2017

(51) Int. Cl.
*E04B 2/00*    (2006.01)
*E04B 5/00*    (2006.01)
(Continued)

(52) U.S. Cl.
CPC ............. *E04B 1/76* (2013.01); *B32B 3/12* (2013.01); *B32B 7/02* (2013.01); *E04B 1/90* (2013.01);
(Continued)

(58) Field of Classification Search
CPC .... B32B 3/26; B32B 3/20; B32B 3/14; B32B 7/00; B32B 7/02; B32B 7/12;
(Continued)

(56) References Cited

U.S. PATENT DOCUMENTS 4,525,406 A * 6/1985 Pollock .............. A41D 31/0038
                                                   428/137
4,550,046 A * 10/1985 Miller .................. B29D 24/005
                                                   428/116
(Continued)

FOREIGN PATENT DOCUMENTS

EP    0978602    2/2000
EP    1703215    9/2006
(Continued)

OTHER PUBLICATIONS

International Search Report for corresponding PCT/US2016/050087, dated Dec. 9, 2016. WO.
Holladay, "Radiant Barriers: A Solution in Search of a Problem," Article, Green Builder Advisor, Posted on Sep. 24, 2010. US.

*Primary Examiner* — Chi Q Nguyen
(74) *Attorney, Agent, or Firm* — Craig M. Sterner

(57) ABSTRACT

A ceiling system includes a ceiling support structure supporting a plurality of ceiling panels, each ceiling panel including a core layer having a top surface facing a first interior space above the ceiling panels, a bottom surface facing a second interior space below the ceiling panels, and a plurality of peripheral edges extending between the top and bottom surfaces. A top frame layer extends from the top surface and a thermal layer is on the top frame layer opposite the top surface. The thermal layer has a first surface facing away from the top frame layer and a second surface facing toward the top frame layer. The top frame layer supports the second surface in a spaced-apart manner from the top surface to form one or more air gaps between the top surface and the second surface. The first and second surfaces have a thermal emissivity of 0.5 or less.

19 Claims, 15 Drawing Sheets

(51) Int. Cl.

| | | |
|---|---|---|
| *E04B 9/00* | (2006.01) | |
| *E04B 1/76* | (2006.01) | |
| *B32B 3/12* | (2006.01) | |
| *B32B 7/02* | (2006.01) | |
| *E04B 1/90* | (2006.01) | |
| *B32B 3/14* | (2006.01) | |
| *B32B 3/26* | (2006.01) | |
| *B32B 7/00* | (2006.01) | |
| *E04B 1/88* | (2006.01) | |
| *E04B 1/80* | (2006.01) | |
| *B32B 7/12* | (2006.01) | |
| *E04B 9/04* | (2006.01) | |
| *B32B 3/20* | (2006.01) | |

(52) U.S. Cl.
CPC ............... *E04B 9/045* (2013.01); *B32B 3/14* (2013.01); *B32B 3/20* (2013.01); *B32B 3/26* (2013.01); *B32B 3/266* (2013.01); *B32B 7/00* (2013.01); *B32B 7/12* (2013.01); *B32B 2307/102* (2013.01); *B32B 2607/00* (2013.01); *E04B 1/7612* (2013.01); *E04B 1/806* (2013.01); *E04B 1/88* (2013.01); *E04B 9/0442* (2013.01); *E04B 2001/7691* (2013.01); *Y10T 428/2457* (2015.01); *Y10T 428/24562* (2015.01); *Y10T 428/24661* (2015.01); *Y10T 428/24678* (2015.01)

(58) Field of Classification Search
CPC . B32B 2607/00; B32B 3/12; B32B 2307/102; B32B 3/266; E04B 1/90; E04B 1/76; E04B 9/045; E04B 1/7612; E04B 2001/7691; E04B 1/88; E04B 9/0442; E04B 1/806; Y10T 428/24678; Y10T 428/24562; Y10T 428/24661; Y10T 428/2457
USPC .......... 52/506.06, 508, 506.03, 793.1, 794.1; 428/138, 304.4, 158, 317.9
See application file for complete search history.

(56) References Cited

U.S. PATENT DOCUMENTS

| | | | |
|---|---|---|---|
| 4,700,521 A | | 10/1987 | Cover |
| 5,092,101 A | * | 3/1992 | Kunert .................... B32B 17/06 156/100 |
| 5,270,092 A | * | 12/1993 | Griffith ..................... B32B 3/12 428/116 |
| 5,338,594 A | * | 8/1994 | Wang ........................ B32B 3/12 156/197 |
| 5,422,446 A | | 6/1995 | Fries |
| 5,851,336 A | * | 12/1998 | Cundiff ................. B29C 70/086 156/272.2 |
| 6,125,608 A | * | 10/2000 | Charlson ............... E04B 1/7604 52/404.1 |
| 6,599,850 B1 | | 7/2003 | Heifetz |
| 6,679,969 B1 | | 1/2004 | Fournier et al. |
| 7,024,832 B2 | | 4/2006 | Matumoto et al. |
| 7,226,559 B2 | * | 6/2007 | Maxwell ............... B29C 70/086 156/245 |
| 7,425,515 B2 | | 9/2008 | Fellinger |
| 7,703,254 B2 | | 4/2010 | Alderman |
| 8,291,660 B2 | | 10/2012 | McCary |
| 8,782,982 B2 | | 7/2014 | Lewis |
| 2006/0029777 A1 | * | 2/2006 | Yanai ...................... E04B 1/806 428/178 |
| 2007/0245664 A1 | * | 10/2007 | Orologio .................. B32B 3/28 52/508 |
| 2008/0256879 A1 | | 10/2008 | Babineau |
| 2009/0087640 A1 | * | 4/2009 | Li ...................... H05K 7/20981 428/304.4 |
| 2011/0296781 A1 | | 12/2011 | McCary |
| 2014/0007533 A1 | | 1/2014 | Wadsworth et al. |
| 2014/0141199 A1 | | 5/2014 | Leonard |
| 2015/0082722 A1 | * | 3/2015 | Kalkanoglu ............. E04D 1/30 52/302.1 |

FOREIGN PATENT DOCUMENTS

| | | |
|---|---|---|
| WO | 9904966 | 2/1999 |
| WO | 2007147812 | 12/2007 |
| WO | 2009135811 | 11/2009 |

\* cited by examiner

CEILING SYSTEM

FIELD

The present invention relates to ceiling systems, and more particularly to ceiling systems having a radiant barrier.

BACKGROUND

One of the paths through which buildings gain and lose heat is by heat transfer through walls and roofs. Heat flow occurs through three basic transfer modes: conduction (through insulation and solids in the building structure), convection (air movement between building surfaces), and radiant transfer (infrared radiant exchange from one surface to other surfaces). The radiant mode of heat transfer can be reduced by the introduction of radiant barriers on building surfaces. Radiant barriers may be found attached directly to the roof deck structure of a building. Radiant barriers may also be created by applying a thermal barrier paint or coating directly to a wall or other building structure. Both these approaches of creating radiant barriers can be costly and difficult to implement, as they require adding one more single purpose insulation item to a building and it's structure.

In view of the advantages presented by the addition of a radiant barrier, such as improving thermal comfort in the interior of a building and reducing energy usage, a better way of adding a radiant barrier to a building is needed.

SUMMARY

A ceiling system is provided which provides a two-way radiant heat barrier which aids in reducing radiant heat loss through the ceiling system from a space within the building and in reducing unwanted heating of the space from radiant heat gain through the ceiling system. In certain embodiments, the ceiling system includes ceiling panels having two radiant barrier surfaces, one facing an interior space above the ceiling panels, and the other facing an interior space below the ceiling panels. In certain non-limiting embodiments, the ceiling panels may be acoustic tiles or panels.

In one embodiment, the ceiling system includes a ceiling support structure to which a plurality of ceiling panels are attached. Each ceiling panel includes a core layer having a top surface facing a first interior space above the ceiling panels, an opposing bottom surface facing a second interior space below the ceiling panels, and a plurality of peripheral edges extending between the top and bottom surfaces. Each ceiling panel further includes a top frame layer on the top surface of the core layer and a thermal layer on the top frame layer opposite the top surface of the core layer. The thermal layer includes a first surface facing away from the top frame layer and an opposing second surface facing toward the top frame layer, and the top frame layer supports the second surface in a spaced-apart manner from the top surface of the core layer to form one or more air gaps between the top surface of the core layer and the second surface of the thermal layer. Each of the first surface and the second surface serve as radiant barriers, with each having a thermal emissivity of 0.1 or less.

In one implementation, each top frame layer is formed integrally with the top surface of each respective core layer as a plurality of ridges extending from the top surface. Alternatively, each top frame layer may be formed integrally with the thermal layer. In alternative implementations, each top frame layer is separately formed and affixed to each respective core layer. Depending upon the material stiffness of the thermal layer, in certain implementations the top frame layer may extend peripherally around the top surface of each respective core layer, or alternatively, the top frame layer may include at least one medial support extending across the top surface of each core layer between peripheral supports of the top frame layer. In certain implementations, at least one of the first surface and the second surface of the thermal layer may be formed from one of a metal foil, a paint, a metal coated polymer film.

In another embodiment, an acoustic ceiling panel includes a core layer having a top surface, an opposing bottom surface, and a plurality of peripheral edges extending between the top and bottom surfaces, wherein the core layer comprises a sound absorption material. A top frame layer extends from the top surface of the core layer, and a thermal layer is on the top frame layer opposite the top surface. The thermal layer includes a first surface facing away from the top frame layer and a second surface opposite the first surface and facing toward the top frame layer, and the top frame layer supports the second surface in a spaced-apart manner from the top surface to form one or more air gaps between the top surface and the second surface. Each of the first surface and the second surface serve as radiant barriers, with each having a thermal emissivity of 0.1 or less.

In yet another embodiment, a method for retrofitting a ceiling system includes affixing radiant barriers to the ceiling panels of the ceiling system. Each ceiling panel has top surface, an opposing bottom surface, and a plurality of peripheral edges extending between the top and bottom surfaces. The retrofitting method includes affixing a top frame layer to the top surface of each of a plurality of the ceiling panels, and affixing a thermal layer to each of the top frame layers opposite the top surface of the respective ceiling panel. The thermal layer includes a first surface facing away from the top frame layer and an opposing second surface facing toward the top frame layer, and the top frame layer supports the second surface in a spaced-apart manner from the top surface of the respective ceiling panel to form one or more air gaps between the top surface of the respective ceiling panel and the second surface of the thermal layer. Each of the first surface and the second surface serve as radiant barriers, with each having a thermal emissivity of 0.1 or less.

BRIEF DESCRIPTION OF THE DRAWINGS

The features of the exemplary embodiments of the present invention will be described with reference to the following drawings, where like elements are labeled similarly, and in which.

Figure 1:
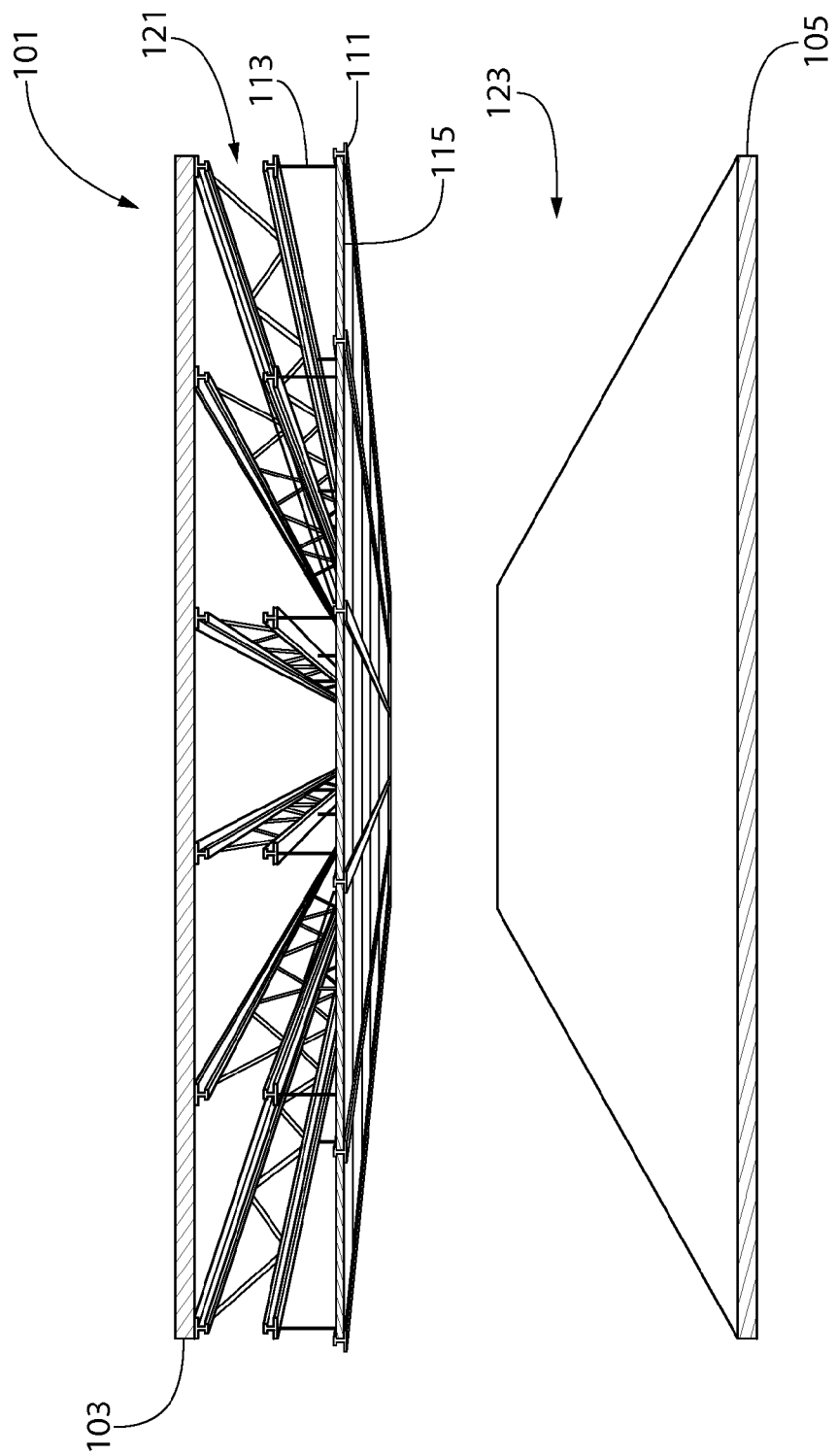
FIG. 1 is a schematic perspective view of the interior of a building having a ceiling system.

All drawings are schematic and not necessarily to scale. Parts given a reference numerical designation in one figure may be considered to be the same parts where they appear in other figures without a numerical designation for brevity unless specifically labeled with a different part number and described herein.

DETAILED DESCRIPTION

The features and benefits of the invention are illustrated and described herein by reference to exemplary embodiments. This description of exemplary embodiments is intended to be read in connection with the accompanying drawings, which are to be considered part of the entire written description. Accordingly, the disclosure expressly should not be limited to such exemplary embodiments illustrating some possible non-limiting combination of features that may exist alone or in other combinations of features.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Throughout this description, the term "ceiling panels" is used interchangeably with the term "ceiling tiles."

Referring to the drawings, FIG. 1 illustrates a building 101 having a roof structure 103, a floor structure 105, and a ceiling system 111 suspended from the roof structure 103. The ceiling system 111 includes a ceiling support structure 113 and a plurality of ceiling panels 115. With the ceiling system 111 suspended in this manner, the interior space of the building 101 is divided into an upper interior space 121 (also referred to herein as the "first interior space") above the ceiling panels 115 and a lower interior space 123 (also referred to herein as the "second interior space") below the ceiling tiles 115. The upper first interior space 121 is the space between the ceiling system and the roof structure 103 of the building 101, whereas the lower interior space 123 is the space to be occupied by people within the building 101.

The ceiling system 111 is not limited to a suspended type ceiling system having a grid-type ceiling support structure 113 which is suspended from the overhead building structure. The ceiling system 111 is also not limited in scope or applicability to such grid systems. Accordingly, the ceiling system may be affixed to the building structure in any manner which leaves at least some air gap between most of the top surface of the ceiling panels 115 and the building structure. By way of example, the ceiling panels 115 may be directly surface mounted to framing members (e.g. wood or metal joists, studs, or other elements) affixed to the building structure. Therefore, the present invention is explicitly not restricted for use with suspended type ceiling systems alone.

Figure 2:
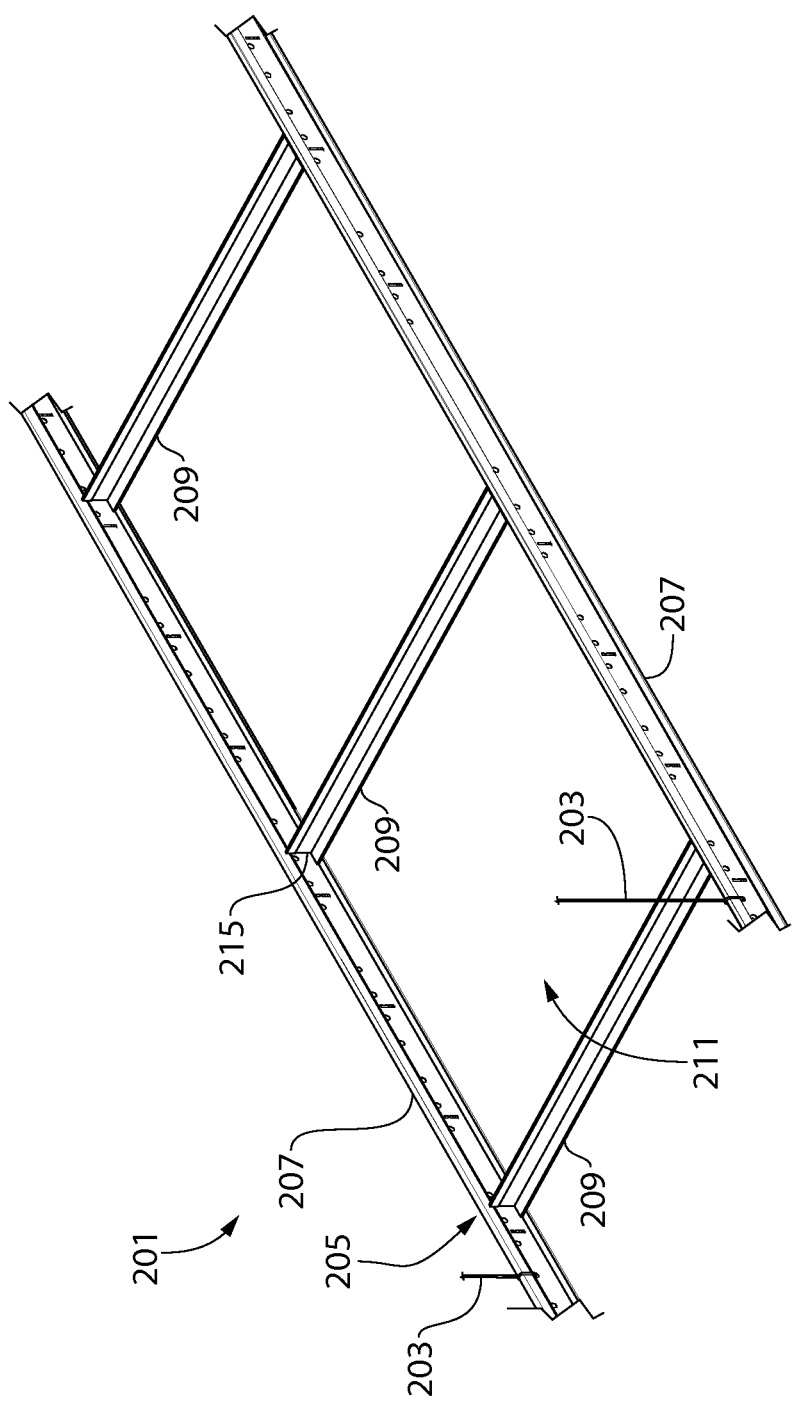
FIG. 2 is a partial perspective view of a ceiling support structure, in the form of a suspended support grid.

An exemplary ceiling support structure 201 is shown in FIG. 2, the ceiling support structure 201 forming part of the ceiling system 111 depicted in FIG. 1. The ceiling support structure 201 is used to support a plurality of ceiling panels or tiles. In one embodiment, the ceiling support structure 201 may be configured for mounting in a suspended manner from the overhead building structure via appropriate hanger elements 203, examples of which include, without limitation, fasteners, hangers, wires, cables, rods, struts, and the like. The ceiling support structure 201 forms a support grid 205 for the ceiling panels from a plurality intersecting longitudinal grid support members 207 (e.g. main beams) and lateral grid support members 209 (e.g. cross tees). The longitudinal grid support members 207 may be referred to as main beams because these grid members in some embodiments alone may be hung by the hanger elements 203 from the overhead building structure, thereby providing support for the entire support grid 205. The lateral grid support members 209 may be referred to as cross tees because these grid members are generally, but not necessarily, supported only by the longitudinal grid support members 207 without having hanger elements 205 securing them to the overhead building structure.

The longitudinal and lateral grid support members 207, 209 are elongated in shape having a length greater than their respective width (e.g. at least twice), and in various embodiments lengths substantially greater than their widths (e.g. 3 times or more). The longitudinal grid support members 207 may have a substantially greater length than the lateral grid support members 209, such that the longitudinal grid support members 207 form "runners" or "rails" which are maintained in a substantially parallel spaced apart relationship by the lateral grid support members 209. The lateral grid support members 209 may be permanently or detachably coupled to and between adjacent (but spaced apart) longitudinal grid support members 207 at appropriate intervals. The manner in which the lateral grid support members 209 are coupled to the longitudinal grid support members 207 is a matter of design choice, and is not to be limiting of the invention. The combination of interconnected longitudinal and lateral grid support members 207, 209 helps provide strength and lateral stability to the ceiling support structure 201. In one non-limiting example, the ceiling support structure 201 may be a metal drywall grid system or suspended grid system available from Armstrong World Industries.

In certain embodiments, the support grid 205 may be horizontally oriented when installed. However, other suitable mounted orientations of the support grid 205, such as wholly or partially angled or sloped (i.e. between 0 and 90 degrees to horizontal), may be used. Accordingly, although the support grid 205 may be described in one exemplary orientation herein as horizontal, the invention is not to be so limited, as all or part of the support grid 205 may be positioned with one or more other orientations.

The longitudinal and lateral grid support members 207, 209 intersect to form an array of grid openings 211 which receive and essentially are closed by ceiling panels when positioned within the openings. In some embodiments, the longitudinal and lateral grid support members 207, 209 may be arranged in an orthogonal pattern to intersect, respectively, at right angles (i.e., perpendicular) to form grid openings 211 which are rectilinear, such as squares or rectangles (in top plan view).

The terminal ends 215 of the lateral grid support members 209 have end connections configured for permanent or detachable connection to the longitudinal grid support members 207 at right angles to form a rectilinear grid pattern. The lateral grid support members 209 may be coupled to the longitudinal grid support members 207 through use of a permanent connection such as, without limitation, welding, soldering, and the like, or through use of a detachable connection such as, without limitation, clips, brackets, threaded fasteners, interlocking tabs/slots, and the like. Accordingly, the present invention is not limited by the manner of attachment or coupling used between the lateral grid support members 209 and the longitudinal grid support members 207. The terminal ends of the longitudinal grid support members 207 have end connections configured for permanent or detachable end-to-end connection to the terminal ends of adjoining longitudinal grid support members 207 to form continuous spans of the main beams. Similar permanent or detachable end connections between adjoining longitudinal grid support members 207 may be used as those described above.

The configuration and orientation of the parts forming the support grid 205 may vary widely while still remaining within the scope of the claims. By way of example, some lateral grid support members 209 may be run the same direction between and parallel to main beam longitudinal grid support members 207, the longitudinal grid support members 207 and the lateral grid support members 209 may intersect at non-perpendicular angles, any part or all of the support grid 205 may be positioned in a horizontal or other orientation. Any combination of such alternative design characteristics may be incorporated into the ceiling support structure 201.

Figure 3:
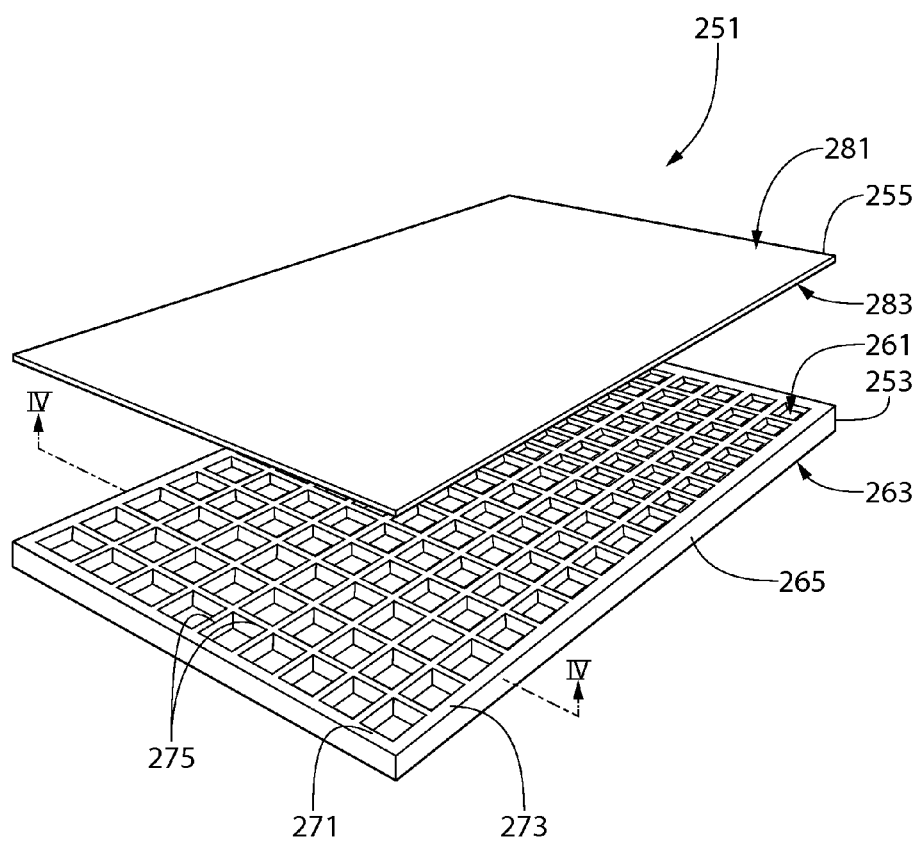
FIG. 3 is an exploded view of an embodiment of a ceiling panel.
Figure 4:
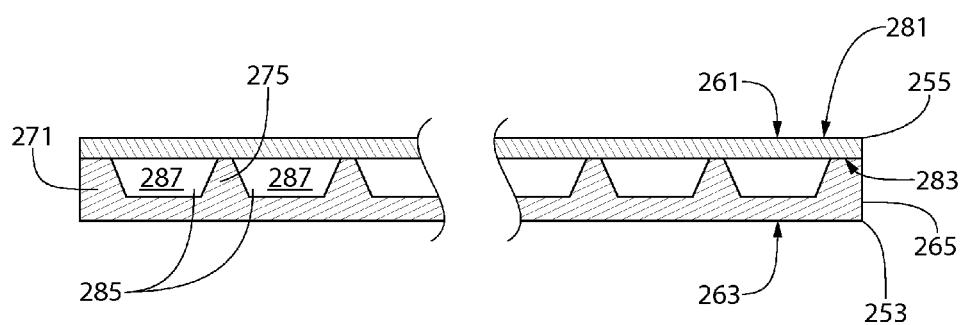
FIG. 4 is a cross-sectional view of the ceiling panel of FIG. 3.

FIG. 3 shows an exploded view of an exemplary ceiling panel 251 for use with the ceiling support structure 201 shown in FIG. 2, and FIG. 4 shows a cross sectional view of this exemplary ceiling panel 251. Referring to both FIGS. 3 and 4, this exemplary ceiling panel 251 includes a core layer 253 and a thermal layer 255. Both the core layer 253 and the thermal layer 255 may be formed from one or more sub-layers. In the exemplary non-limiting embodiment shown, the ceiling panel 251 has a generally rectangular shape. In other embodiments, the ceiling panel 251 may be square, have more or fewer peripheral sides, or be irregularly shaped.

The core layer 253 includes a top surface 261, a bottom surface 263, and a plurality of peripheral edges 265 extending between the top and bottom surfaces 261, 263. The peripheral edges 265 may be planer, or in alternative embodiments they may be configured with non-planer features to better integrate with the configuration of a selected support grid. The configuration of the peripheral edges 265 are not intended to be limiting of the scope of the claims. When the ceiling panel 251 is placed within and supported by a support grid within an interior space within a building, the top surface 261 of the core layer 253 faces toward the upper interior space of the building, and the bottom surface 263 of the core layer 253 faces toward the lower interior space of the building. The bottom surface 263 of the core layer 253 may be generally planar so that when a plurality of ceiling panels 251 are placed within the support grid, a uniform and substantially planar surface is presented to the lower interior space of the building.

The top surface 261 of the core layer 253 includes a top frame layer 271 extending therefrom. In the embodiment depicted in FIG. 3, the top frame layer 271 is integrally formed with the top surface 261. The top frame layer 271 is formed from a peripheral ridge 273 with a plurality of lateral and longitudinal ridges 275 extending medially across the top surface 261 within the peripheral ridge 273, so that the lateral and longitudinal ridges 275 form a grid bounded by the peripheral ridge 273. The number of lateral and longitudinal ridges 275 included as part of the top frame layer 271 may vary, with the stiffness of the thermal layer 255 being one factor which may determine the number of included lateral and longitudinal ridges 275.

The thermal layer 255 is positioned on the top frame layer 271 opposite the core layer 253, such that the thermal layer 255 has a first surface 281 facing away from the top frame layer 271 and an opposing second surface 283 facing toward the top frame layer 271. The top frame layer 271 thus supports the second surface 283 of the thermal layer 255 off the top surface 261 of the core layer 253 in a spaced apart manner to form an air gap 285 between the top surface 261 of the core layer 253 and the second surface 283 of the thermal layer 255. As is depicted in this embodiment, the air gap 285 may be discontiguous within the peripheral ridge 273 of the top frame layer 271, so that there are a plurality of air pockets 287 forming the air gap 285. In certain embodiments, the air gap 285 may be contiguous. Depending on the configuration of the top frame layer 271, at least one air gap is formed between the top surface 261 of the core layer 253 and the second surface 283 of the thermal layer 255.

The thermal layer 253 and the top frame layer 271 may be affixed to one another using any appropriate technique for a desired application while still remaining within the scope of the claims. By way of example, the thermal layer 253 and the top frame layer 271 may be affixed together using an appropriate adhesive or fasteners. In certain embodiments, depending upon the materials used for the respective components, the thermal layer 255 and the top frame layer 271 may each include interlocking components which serve to affix each to the other.

The distance between the second surface 283 of the thermal layer 255 and the to surface 261 of the core layer 253 may be as little as 0.05 in to 0.1 in to form the air gap 285. The air gap 285 may also be larger in certain embodiments, as a larger air gap 285 may have other benefits, such as aiding in sound attenuation. The surface area interface between the air gap 285 and the second surface 283 of the thermal layer 255 is preferably maximized in consideration of factors which may include, the rigidity of the thermal layer 255, durability of the ceiling panel 201, ease of assembly, and cost of materials, among others.

Figure 15:
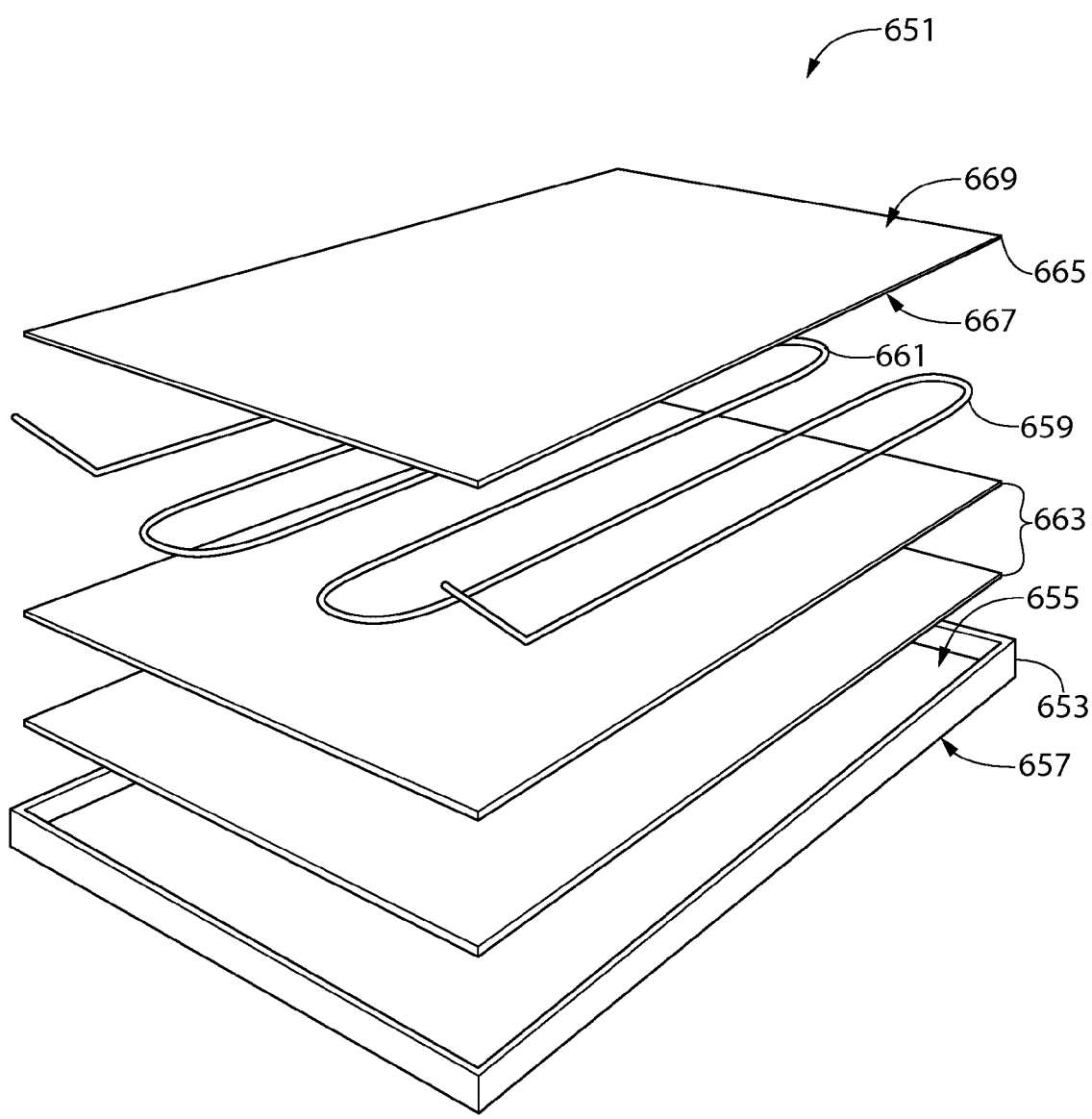
FIG. 15 is a cross-sectional view of another embodiment of a ceiling panel.

The air gap 285 may be formed in numerous different ways. For example, while FIGS. 3 and 4 depict a top frame layer 271 which is integrally formed with the core layer 253, in the embodiment shown in FIGS. 7 and 8, the top frame layer is separately formed from and coupled to the core layer to create the air gap. In certain other embodiments, the top frame layer may be formed integrally with the thermal layer, such as is shown in FIG. 15, to create the air gap. In yet other embodiments, the air gap 285 may be formed in any other desired manner, not to be limited except by the scope of the claims.

Both the first surface 281 and the second surface 283 of the thermal layer 255 are configured to serve as radiant thermal barriers, with each having a thermal emissivity of 0.5 or less. These radiant thermal barriers may be formed using a foil as the thermal layer 255. Such a thermal layer, when having air space immediately adjacent both the first surface 281 and the second surface 283, serves as a bi-directional radiant thermal barrier. The air gap formed adjacent the second surface 283 of the thermal layer 255 and the upper interior space of the building, when the ceiling system is installed into a building as described above, adjacent the first surface 281 of the thermal layer 255 enable both the first surface 281 and the second surface 283 to function as radiant thermal barriers. Moreover, depending on the type of foil used, and particularly the properties of the opposing surfaces of the foil, a thermal emissivity of as low as 0.03 to 0.01 may be achieved for one or both the first surface 281 and the second surface 283 of the thermal layer 255.

Additional materials may be used to form or as part of the thermal layer 255 so that both the first surface 281 and the second surface 283 form a radiant thermal barrier having an emissivity of 0.5 or less, and preferably of 0.1 or less. For example, the thermal layer may be formed by any metallic foil, a base material coated with low emissivity paint or other coating (particularly those which reflect light in the infrared spectrum, alternatively a metalized or metal-coated polymer film, a metal layer with highly reflective surfaces.

The core layer 253 may be constructed of any suitable material or combinations of different materials, which in certain embodiments preferably have acoustical properties. Some non-limiting examples of core layer 253 materials that may be used include, without limitation, mineral fiber board, fiberglass, metals, polymers, metal, wood, composites, combinations thereof, or other. Embodiments of the core layer 253 may be constructed so that the ceiling panel 251 has a sufficiently high noise reduction coefficient (NRC) and ceiling attenuation class (CAC) rating to be characterized as an acoustical substrate in contrast to gypsum-based drywall having substantially lower NRCs (e.g. 0.05) characteristic of sound reflecting, not absorbing materials. NRC is a measure of sound energy absorption of a material. An NRC rating of 0 is a perfect sound reflection material. An NRC rating of 1 is a perfect sound absorption material. CAC is a measure for rating the performance of a ceiling material as a barrier to block airborne sound transmission through the material to/from the upper interior space above the suspended ceiling panels and into an adjacent room. This property is measured in decibels (dB).

In some embodiments, the core layer 253 may impart to the ceiling panel 251 an NRC of at least 0.50 and/or CAC of at least 30 dB depending on the desired acoustical characteristics of the ceiling system. In a certain embodiment, the NRC rating may be at least 0.70. In certain other embodiments, additional acoustic layers and/or features may be included as part of the ceiling panel 251, along with the core layer 253, to achieve desired acoustic properties for the ceiling panel 251.

Figure 5:
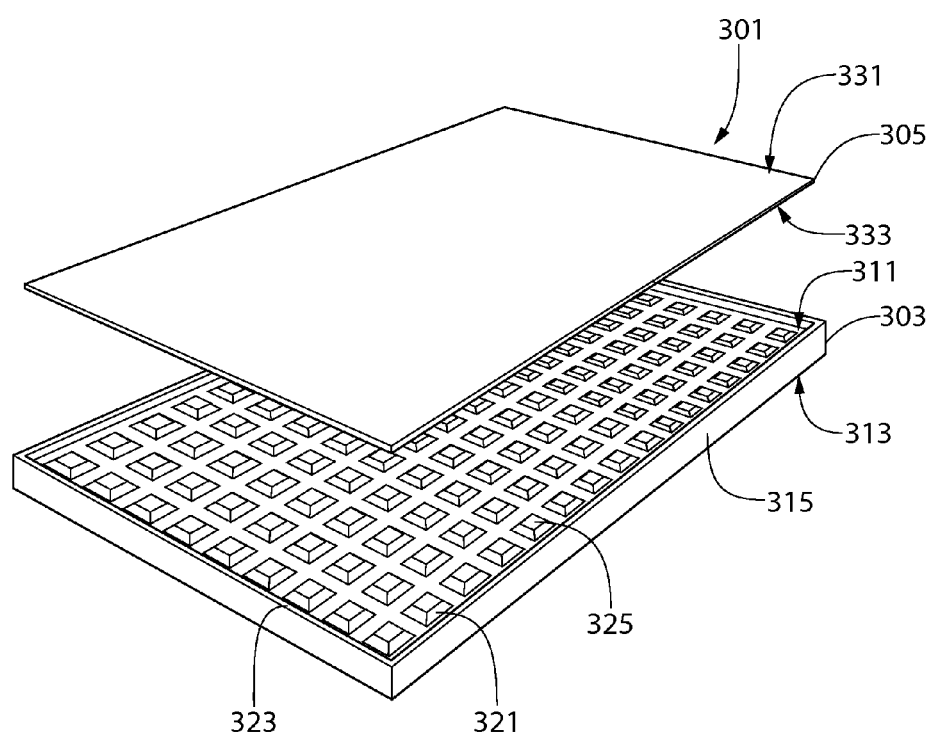
FIG. 5 is an exploded view of another embodiment of a ceiling panel.

FIG. 5 shows an exploded view of another exemplary ceiling panel 301, which includes a core layer 303 and a thermal layer 305. The core layer 303 includes a top surface 311, a bottom surface 313, and a plurality of peripheral edges 315 extending between the top and bottom surfaces 311, 313. When the ceiling panel 301 is placed within and supported by a support grid within an interior space within a building, the top surface 311 of the core layer 303 faces toward the upper interior space of the building, and the bottom surface 313 of the core layer 303 faces toward the lower interior space of the building.

The top surface 311 of the core layer 303 includes a top frame layer 321 extending therefrom. In the embodiment depicted in FIG. 5, the top frame layer 321 is integrally formed with the top surface 311. The top frame layer 321 is formed from a peripheral ridge 323 with a plurality of support structures 325, each having a flat upper surface 327, extending from the top surface 311 within the peripheral ridge 323. The number of support structures 325 included as part of the top frame layer 321 may vary, with the stiffness of the thermal layer 305 being one factor which may determine the number of included support structures 325.

The thermal layer 305 is positioned on the top frame layer 321 opposite the core layer 303, such that the thermal layer 305 has a first surface 331 facing away from the top frame layer 321 and an opposing second surface 333 facing toward the top frame layer 321. The top frame layer 321 thus supports the second surface 333 of the thermal layer 305 off the top surface 311 of the core layer 303 in a spaced apart manner to form an air gap between the top surface 311 of the core layer 303 and the second surface 333 of the thermal layer 305. In this embodiment, the air gap is contiguous within the peripheral ridge 323 of the top frame layer 321. The thermal layer 305 and the top frame layer 321 may be affixed to one another using any appropriate technique for a desired application while still remaining within the scope of the claims.

Both the first surface 331 and the second surface 333 of the thermal layer 305 are configured to serve as radiant thermal barriers, with each having a thermal emissivity of 0.5 or less, depending upon the type of material selected to form the respective radiant thermal barriers. As discussed above, the thermal layer 305 when having air space immediately adjacent both the first surface 331 and the second surface 333, serves as a bi-directional radiant thermal barrier when the ceiling system is installed into a building as described above.

Figure 6:
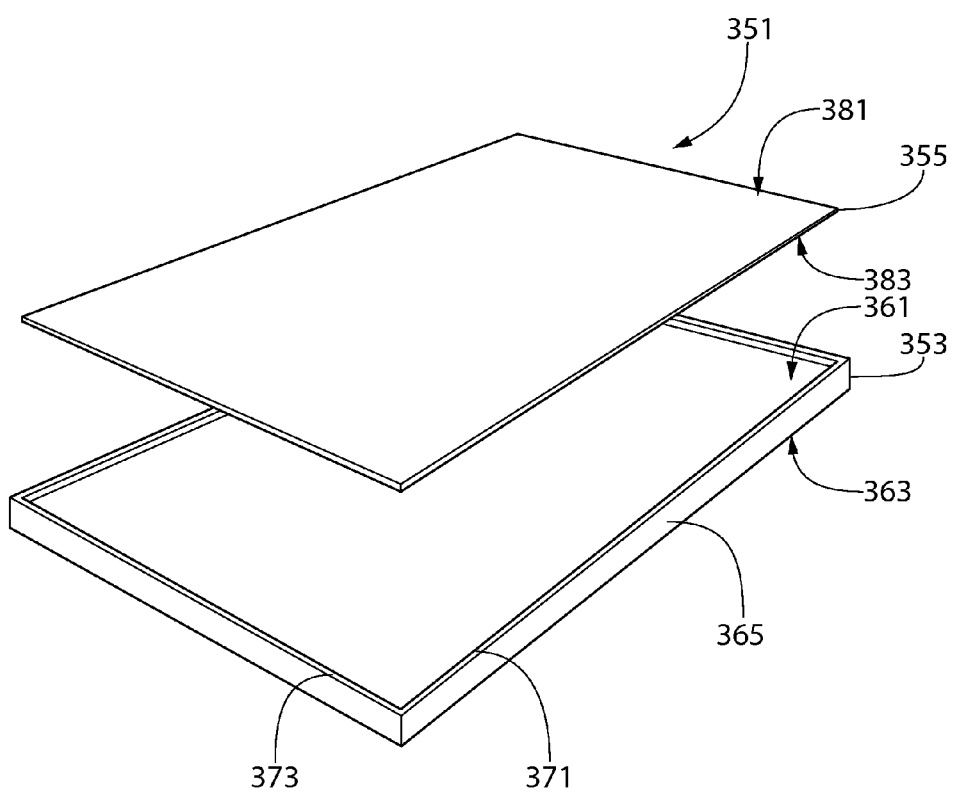
FIG. 6 is an exploded view of another embodiment of a ceiling panel.

FIG. 6 shows an exploded view of another exemplary ceiling panel 351, which includes a core layer 353 and a thermal layer 355. The core layer 353 includes a top surface 361, a bottom surface 363, and a plurality of peripheral edges 365 extending between the top and bottom surfaces 361, 363. When the ceiling panel 351 is placed within and supported by a support grid within an interior space within a building, the top surface 361 of the core layer 353 faces toward the upper interior space of the building, and the bottom surface 363 of the core layer 353 faces toward the lower interior space of the building.

The top surface 361 of the core layer 353 includes a top frame layer 371 extending therefrom. In the embodiment depicted in FIG. 6, the top frame layer 371 is integrally formed with the top surface 361, and the top frame layer 371 is formed from a peripheral ridge 373.

The thermal layer 355 is positioned on the top frame layer 371 opposite the core layer 353, such that the thermal layer 355 has a first surface 381 facing away from the top frame layer 371 and an opposing second surface 383 facing toward the top frame layer 371. In this embodiment, the thermal layer 355 is formed of a material that has sufficient rigidity to prevent a central portion of the thermal layer 355 from sagging and coming into contact with the top surface 361 of the core layer 353. The top frame layer 371 thus supports the second surface 383 of the thermal layer 355 off the top surface 361 of the core layer 353 in a spaced apart manner to form an air gap between the top surface 361 of the core layer 353 and the second surface 383 of the thermal layer 355. In this embodiment, the air gap is contiguous within the peripheral ridge 373 of the top frame layer 371. The thermal layer 355 and the top frame layer 371 may be affixed to one another using any appropriate technique for a desired application while still remaining within the scope of the claims.

Both the first surface 381 and the second surface 383 of the thermal layer 355 are configured to serve as radiant thermal barriers, with each having a thermal emissivity of 0.5 or less, depending upon the type of material selected to form the respective the respective first and second surfaces 381, 383. As discussed above, the thermal layer 355 when having air space immediately adjacent both the first surface 381 and the second surface 383, serves as a bi-directional radiant thermal barrier when the ceiling system is installed into a building as described above.

FIGS. 7-15 illustrate ceiling panels which may be manufactured having the layer configuration as shown. In certain embodiments, however, a pre-existing ceiling system installation may include a plurality of ceiling panels, each of which may be used in whole or in part as a core layer to which may be retrofit with the other layers shown and described in each of FIGS. 7-15 to form a ceiling panel according to the invention. Thus, the ceiling panels in a pre-existing ceiling system installation may be improved without replacing the entire ceiling system with an entirely new one.

Figure 7:
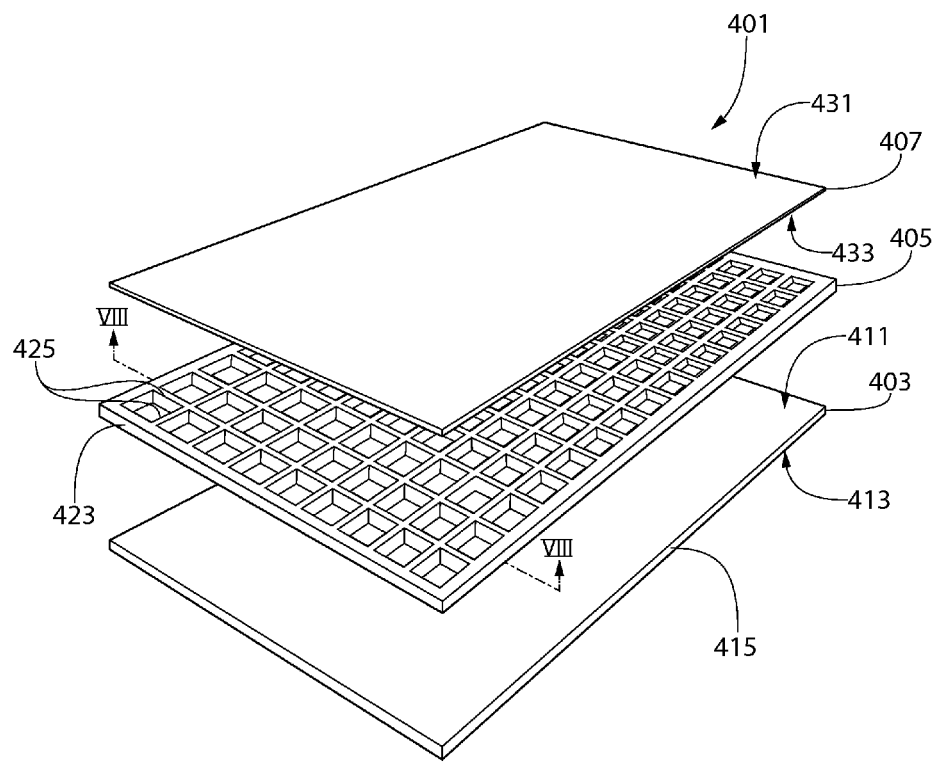
FIG. 7 is an exploded view of another embodiment of a ceiling panel.
Figure 8:
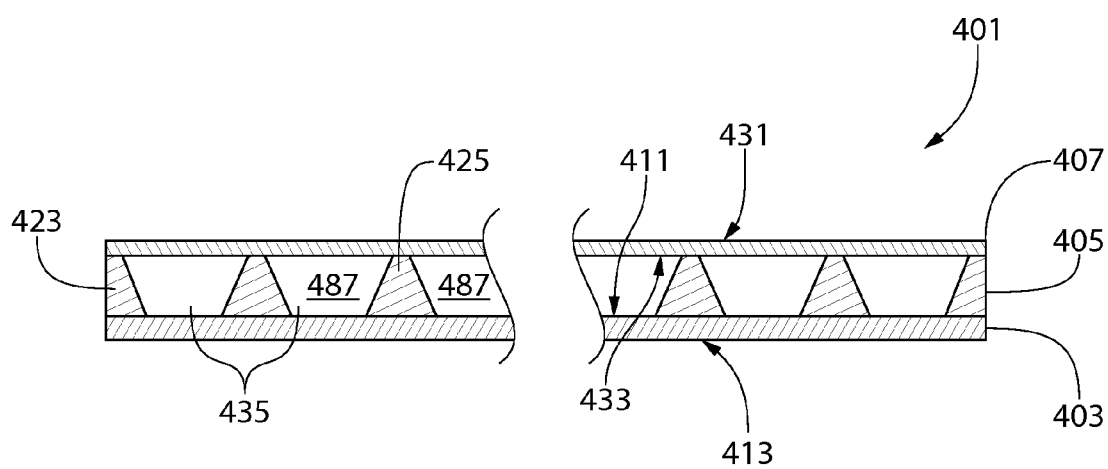
FIG. 8 is a cross-sectional view of the ceiling panel of FIG. 7.

FIG. 7 shows an exploded view of another exemplary ceiling panel 401, and FIG. 8 shows a cross sectional view of this exemplary ceiling panel 401. Referring to both FIGS. 7 and 8, this ceiling panel 401 includes a core layer 403, a separate top frame layer 405, and a thermal layer 407. The core layer 403 includes a top surface 411, a bottom surface 413, and a plurality of peripheral edges 415 extending between the top and bottom surfaces 411, 413. When the ceiling panel 401 is placed within and supported by a support grid within an interior space within a building, the top surface 411 of the core layer 403 faces toward the upper interior space of the building, and the bottom surface 413 of the core layer 403 faces toward the lower interior space of the building.

The top frame layer 405 is placed on and extends upward from the top surface 411 of the core layer 403, and in this embodiment, the top frame layer 405 is formed separately from the core layer 403. The core layer 403 and the top frame layer 405 may be affixed to one another using any appropriate technique for a desired application while still remaining within the scope of the claims. By way of example, the core layer 403 and the top frame layer 405 may be affixed together using an appropriate adhesive or fasteners.

The top frame layer 405 includes a peripheral edge 423 with a plurality of lateral and longitudinal support ribs 425 within the peripheral edge 423, so that the lateral and longitudinal support ribs 425 form a grid bounded by the peripheral edge 423. The number of lateral and longitudinal support ribs 425 included as part of the top frame layer 405 may vary, with the stiffness of the thermal layer 407 being one factor which may determine the number of included support ribs 425.

The thermal layer 407 is positioned on the top frame layer 405 opposite the core layer 403, such that the thermal layer 407 has a first surface 431 facing away from the top frame layer 405 and an opposing second surface 433 facing toward the top frame layer 405. The top frame layer 405 thus supports the second surface 433 of the thermal layer 407 off the top surface 411 of the core layer 403 in a spaced apart manner to form an air gap 435 between the top surface 411 of the core layer 403 and the second surface 433 of the thermal layer 407. As is depicted in this embodiment, the air gap 435 is discontiguous within the peripheral edge 423 of the top frame layer 405, so that there are a plurality of air pockets 487 forming the air gap 435. The thermal layer 407 and the top frame layer 405 may be affixed to one another using any appropriate technique for a desired application while still remaining within the scope of the claims.

Both the first surface 431 and the second surface 433 of the thermal layer 407 are configured to serve as radiant thermal barriers, with each having a thermal emissivity of 0.5 or less, depending upon the type of material selected to form the respective the respective first and second surfaces 431, 433. As discussed above, the thermal layer 407 when having air space immediately adjacent both the first surface 431 and the second surface 433, serves as a bi-directional radiant thermal barrier when the ceiling system is installed into a building as described above.

Figure 9:
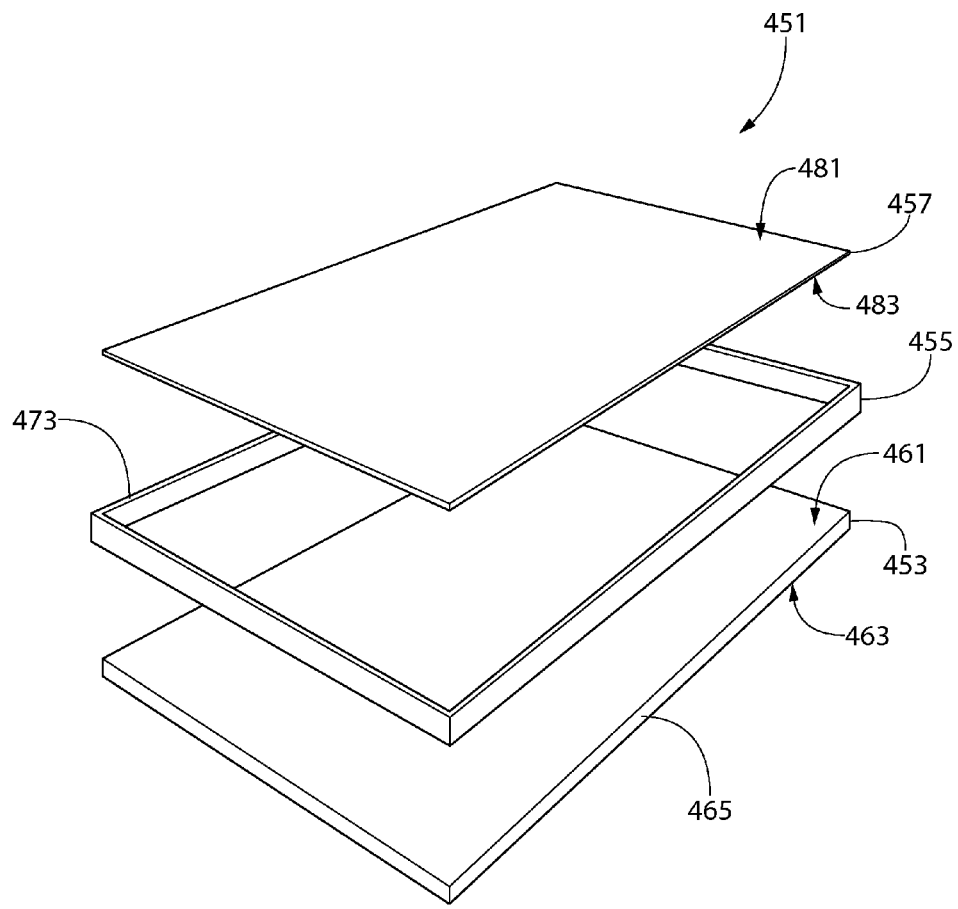
FIG. 9 is an exploded view of another embodiment of a ceiling panel.

FIG. 9 shows an exploded view of another exemplary ceiling panel 451. This ceiling panel 451 includes a core layer 453, a separate top frame layer 455, and a thermal layer 457. The core layer 453 includes a top surface 461, a bottom surface 463, and a plurality of peripheral edges 465 extending between the top and bottom surfaces 461, 463. When the ceiling panel 451 is placed within and supported by a support grid within an interior space within a building, the top surface 461 of the core layer 453 faces toward the upper interior space of the building, and the bottom surface 463 of the core layer 453 faces toward the lower interior space of the building.

The top frame layer 455 is placed on and extends upward from the top surface 461 of the core layer 453, and in this embodiment, the top frame layer 455 is formed separately from the core layer 453. The core layer 453 and the top frame layer 455 may be affixed to one another using any appropriate technique for a desired application while still remaining within the scope of the claims.

The top frame layer 455 is formed as a peripheral frame 473 having the same general shape as the periphery of the core layer 453. When the peripheral frame 473 is situated on the core layer 453, it extends around the periphery of the core layer 453. The thermal layer 457 is positioned on the top frame layer 455 opposite the core layer 453, such that the thermal layer 457 has a first surface 481 facing away from the top frame layer 455 and an opposing second surface 483 facing toward the top frame layer 455. In this embodiment, the thermal layer 457 is formed of a material that has sufficient rigidity to prevent a central portion of the thermal layer 457 from sagging and coming into contact with the top surface 461 of the core layer 453. The top frame layer 455 thus supports the second surface 483 of the thermal layer 457 off the top surface 461 of the core layer 453 in a spaced apart manner to form an air gap between the top surface 461 of the core layer 453 and the second surface 483 of the thermal layer 457. In this embodiment, the air gap is contiguous within the peripheral frame 473 of the top frame layer 455. The thermal layer 457 and the top frame layer 455 may be affixed to one another using any appropriate technique for a desired application while still remaining within the scope of the claims.

Both the first surface 481 and the second surface 483 of the thermal layer 457 are configured to serve as radiant thermal barriers, with each having a thermal emissivity of 0.5 or less, depending upon the type of material selected to form the respective the respective first and second surfaces 481, 483. As discussed above, the thermal layer 457 when having air space immediately adjacent both the first surface 481 and the second surface 483, serves as a bi-directional radiant thermal barrier when the ceiling system is installed into a building as described above.

Figure 10:
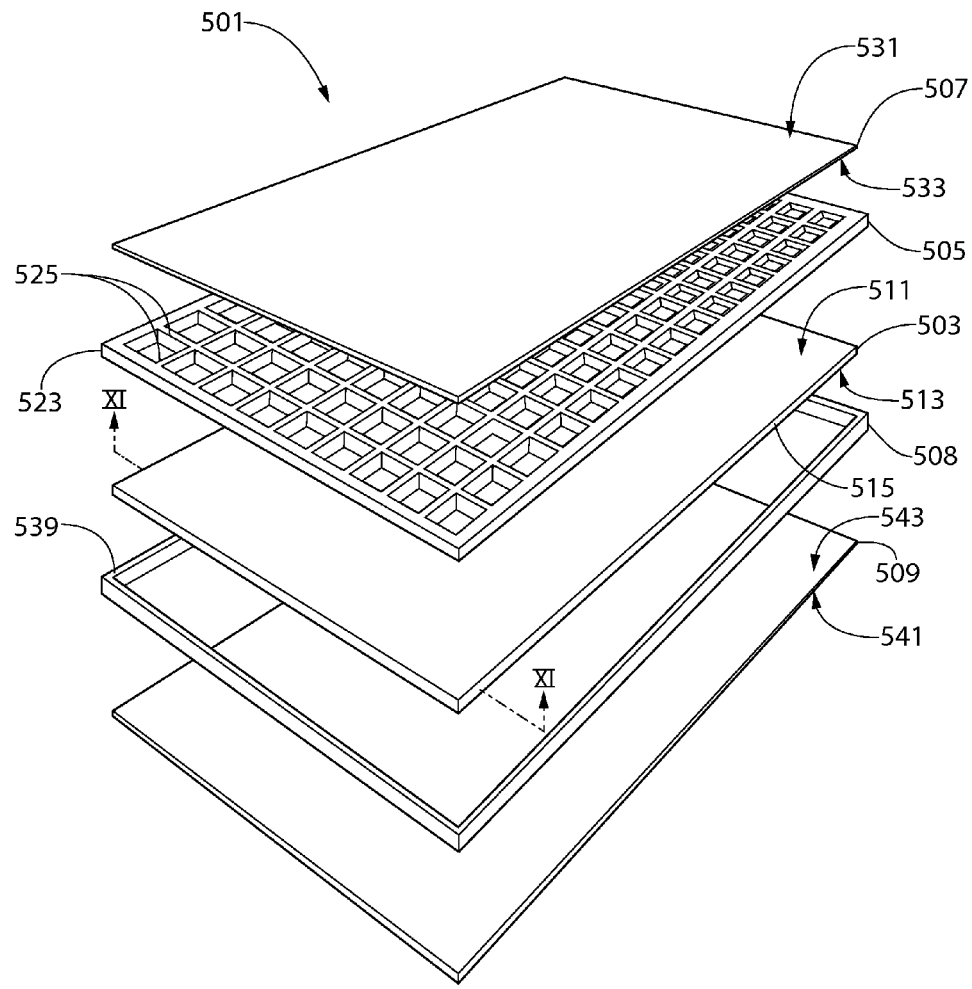
FIG. 10 is an exploded view of another embodiment of a ceiling panel.
Figure 11:
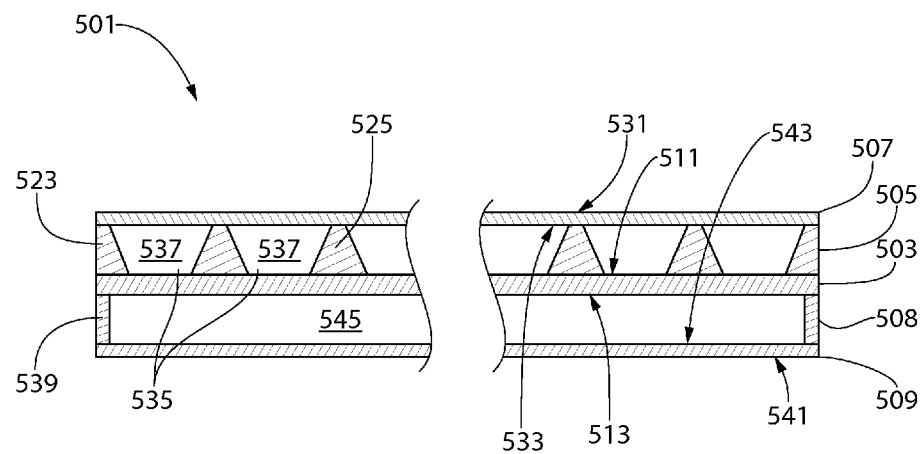
FIG. 11 is a cross-sectional view of the ceiling panel of FIG. 10.

FIG. 10 shows an exploded view of another exemplary ceiling panel 501, and FIG. 11 shows a cross sectional view of this exemplary ceiling panel 501. Referring to both FIGS. 10 and 11, this ceiling panel 501 includes a core layer 503, a separate top frame layer 505, a thermal layer 507, a separate bottom frame layer 508, and a bottom layer 509. The core layer 503 includes a top surface 511, a bottom surface 513, and a plurality of peripheral edges 515 extending between the top and bottom surfaces 511, 513. When the ceiling panel 501 is placed within and supported by a support grid within an interior space within a building, the top surface 511 of the core layer 503 faces toward the upper interior space of the building, and the bottom surface 513 of the core layer 503 faces toward the lower interior space of the building.

The top frame layer 505 is placed on and extends upward from the top surface 511 of the core layer 503, and in this embodiment, the top frame layer 505 is formed separately from the core layer 503. The core layer 503 and the top frame layer 505 may be affixed to one another using any appropriate technique for a desired application while still remaining within the scope of the claims.

The top frame layer 505 includes a peripheral edge 523 with a plurality of lateral and longitudinal support ribs 525 within the peripheral edge 523, so that the lateral and longitudinal support ribs 525 form a grid bounded by the peripheral edge 523. The number of lateral and longitudinal support ribs 525 included as part of the frame layer 505 may vary, with the stiffness of the thermal layer 507 being one factor which may determine the number of included support ribs 525.

The thermal layer 507 is positioned on the top frame layer 505 opposite the core layer 503, such that the thermal layer 507 has a first surface 531 facing away from the top frame layer 505 and an opposing second surface 533 facing toward the top frame layer 505. The top frame layer 505 thus supports the second surface 533 of the thermal layer 507 off the top surface 511 of the core layer 503 in a spaced apart manner to form an air gap 535 between the top surface 511 of the core layer 503 and the second surface 533 of the thermal layer 507. As is depicted in this embodiment, the air gap 535 is discontiguous within the peripheral edge 523 of the top frame layer 505, so that there are a plurality of air pockets 537 forming the air gap 535. The thermal layer 507 and the top frame layer 505 may be affixed to one another using any appropriate technique for a desired application while still remaining within the scope of the claims.

Both the first surface 531 and the second surface 533 of the thermal layer 507 are configured to serve as radiant thermal barriers, with each having a thermal emissivity of 0.5 or less, depending upon the type of material selected to form the respective first and second surfaces 531, 533. As discussed above, the thermal layer 507 when having air space immediately adjacent both the first surface 531 and the second surface 533, serves as a bi-directional radiant thermal barrier when the ceiling system is installed into a building as described above.

The bottom frame layer 508 is placed adjacent and extends downward from the top surface 511 of the core layer 503, and in this embodiment, the bottom frame layer 508 is formed separately from the core layer 503 as a peripheral frame 539. The bottom frame layer 508 may take on other forms, and is not to be so limited. The core layer 503 and the bottom frame layer 508 may be affixed to one another using any appropriate technique for a desired application while still remaining within the scope of the claims. By way of example, the bottom frame layer 508 and the core layer 503 may be affixed together using an appropriate adhesive or fasteners. In certain embodiments, the core layer 503 may simply rest upon the bottom frame layer 508 when the ceiling panel 501 is placed within and supported by a support grid within an interior space within a building. In certain other embodiments, the bottom frame layer 508 may be integrally formed with the core layer 503. In still certain other embodiments, the bottom frame layer 508 may be integrally formed with the bottom layer 509.

The bottom layer 509 is positioned on the bottom frame layer 508 opposite the core layer 503, such that the bottom layer 509 has a first surface 541 facing away from the bottom frame layer 508 and an opposing second surface 543 facing toward the bottom frame layer 508. The bottom frame layer 508 thus supports the second surface 543 of the bottom layer 509 off the bottom surface 513 of the core layer 503 in a spaced apart manner to form an air gap 545 between the bottom surface 513 of the core layer 503 and the second surface 543 of the thermal layer 507. In certain embodiments, the air gap 545 may serve to provide additional sound attenuation properties to the ceiling panel 501. The first surface 541 of the bottom layer 509 may include decorative features facing the lower interior space of the building, with the decorative features being provided by way of painting, image printing, or embossed or woven textures. By way of other examples, the first surface 541 may have a uniform color to suit the lower interior space of the building, with the color being provided by a paint or the coloration of the composite fibers and binder used to construct the bottom layer 509. In still other embodiments, the first surface 541 may be coated with a discontinuous layer of paint to provide both a decorative surface and maintain a desired amount of sound attenuation/absorption properties for the bottom layer 509 and/or the ceiling tile 501 as a whole. In still other embodiments, the first surface 541 may be molded to create dimensional shapes, geometries, and/or textures. Regardless of how a decorative first surface 541 is created, it is preferable that the first surface have an air-flow resistance of no greater than 800 mks rayls.

The bottom layer 509 may be constructed of any suitable material or combinations of different materials to provide one or more desired properties, such as a decorative surface facing the lower interior space of the building, thermal insulation, sound insulation, flame retardant, and the like. The bottom layer 509 may also include two or more sub-layers, with each sub-layer providing the bottom layer 509 with a different desired property. The bottom layer 509 preferably is constructed a material or materials which impart sufficient stiffness so that once installed within a ceiling system, the bottom layer 509 does not sag or bend downward away from the core layer. Depending upon the material chosen for the bottom layer 509, the bottom frame 508 may include medial cross members to which the bottom layer 509 is affixed to prevent undesirable sagging or bending.

In certain embodiments, the bottom layer 509 may be formed, at least in part, from non-combustible fibers, both woven and non-woven, such as glass strand, mineral wool, fiberglass, fiber scrim, veil, and basalt; flame-retarded natural fibers, both woven and non-woven, such as wool, cellulose, cotton, cotton shoddy, recycled denim, jute, flax, kenaf, hemp, or paper; flame retarded synthetic fibers, such as staple polyester, rayon, polyolefin, poly lactic acid or nylon may also be considered; or from any other type of woven or non-woven fiber desirable for a particular application. Such fibers or fiber blends may be bound with a thermoplastic bicomponent polymer binder fiber, a polymer latex, a styrene-acrylate, or styrene-butadiene latexes. Any such fiber or fiber blends may be bound with a solution polymer binder such as starch, polyvinyl alcohol or polyvinyl acetate. A binder combination system of solution polymer and a thermoplastic might also be employed. Likewise a thermosetting resin such as a phenol-formaldehyde or urea-formaldehyde, a reactive polyester resin, acrylic or epoxy resin may be used to bind and stiffen nonwoven textile or paper. Further, for embodiments in which the bottom layer 509 is formed from two or more sub-layers, each sub-layer may be independently formed with a fiber or fiber blend as desired.

In certain embodiments, the bottom layer 509 may be constructed so that the first surface 541 is formed from a mini or micro-porous plate of metal, ceramic, cement, aggregate, or flame-retarded plastic or wood; a plate that includes perforations, a sintered surface, or a fused particulate structure that is permeable to air and therefore sound. For a perforated plate, it is preferable that the plate thickness, perforation diameters, perforation density per unit area and distance between perforations minimizes the amount that the perforations are visible to a viewer of the ceiling plane when the ceiling system is installed in a building.

In certain embodiments, the bottom layer 509 may be constructed to have a thickness that provides an improvement in high frequency sound absorption/attenuation in the range of 1 kHz and above. In addition, or in the alternative, the bottom layer 509 may be formed from sub-layers which likewise provide an improvement in high frequency sound absorption/attenuation in the range of 1 kHz and above.

The bottom frame 508 may be constructed of any suitable material or combinations of different materials, such as, for example, metal, cardboard, plastic, wood, and the like. A bottom frame 508 which creates about ¼ in or wider separation between the second surface 543 of the bottom layer 509 and the core layer 503 may be desirable to enhance acoustical attenuation/absorption in the higher frequency range of about 1 kHz or more. Such a separation may provide an increase to an existing ceiling tile having an NRC in the 0.50-0.60 range by about 0.10 NRC. In certain embodiments, the bottom frame 508 may be affixed to the core layer 503 by an appropriate adhesive or by fasteners. In certain other embodiments, the bottom frame 508 may be formed integrally with the core layer 503. By way of example, the bottom frame 508 may be rendered into the core layer 503 by infusing the perimeter of the core layer 503 with a resin that stiffens upon drying or curing, such as polyvinyl acetate, certain types of wood glue, or acrylic polyesters, furan resins, polyurethanes, diisocyanates, epoxies, and the like.

Figure 12:
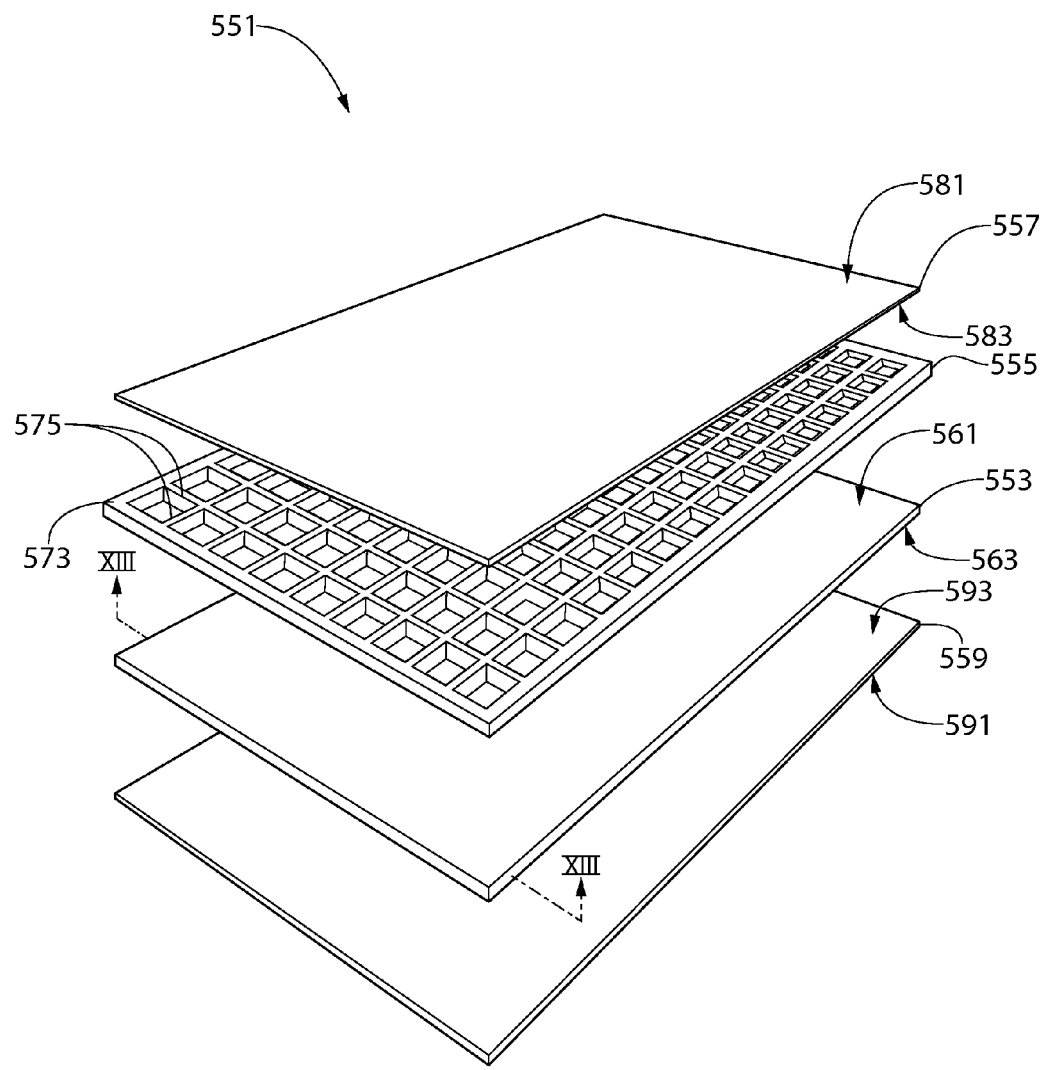
FIG. 12 is an exploded view of another embodiment of a ceiling panel.
Figure 13:
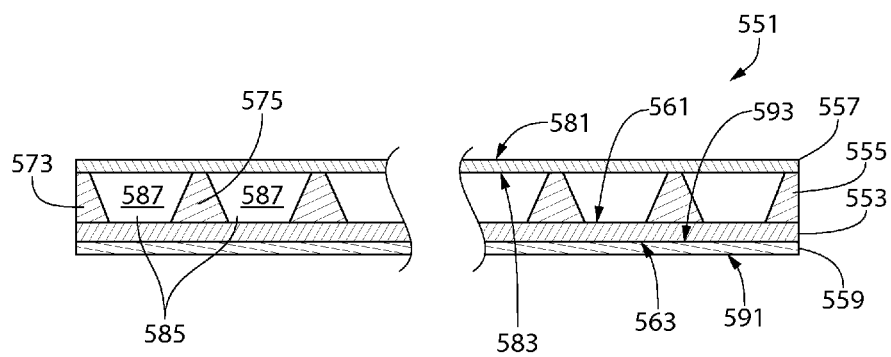
FIG. 13 is a cross-sectional view of the ceiling panel of FIG. 12.

FIG. 12 shows an exploded view of another exemplary ceiling panel 551, and FIG. 13 shows a cross sectional view of this exemplary ceiling panel 551. Referring to both FIGS. 12 and 13, this ceiling panel 551 includes a core layer 553, a separate top frame layer 555, a thermal layer 557, and a bottom layer 559. The core layer 553 includes a top surface 561, a bottom surface 563, and a plurality of peripheral edges 565 extending between the top and bottom surfaces 561, 563. When the ceiling panel 551 is placed within and supported by a support grid within an interior space within a building, the top surface 561 of the core layer 553 faces toward the upper interior space of the building, and the bottom surface 563 of the core layer 553 faces toward the lower interior space of the building.

The top frame layer 555 is placed on and extends upward from the top surface 561 of the core layer 553, and in this embodiment, the top frame layer 555 is formed separately from the core layer 553. The core layer 553 and the top frame layer 555 may be affixed to one another using any appropriate technique for a desired application while still remaining within the scope of the claims.

The top frame layer 555 includes a peripheral edge 573 with a plurality of lateral and longitudinal support ribs 575 within the peripheral edge 573, so that the lateral and longitudinal support ribs 575 form a grid bounded by the peripheral edge 573. The number of lateral and longitudinal support ribs 575 included as part of the frame layer 555 may vary, with the stiffness of the thermal layer 557 being one factor which may determine the number of included support ribs 575.

The thermal layer 557 is positioned on the top frame layer 555 opposite the core layer 553, such that the thermal layer 557 has a first surface 581 facing away from the top frame layer 555 and an opposing second surface 583 facing toward the top frame layer 555. The top frame layer 555 thus supports the second surface 583 of the thermal layer 557 off the top surface 561 of the core layer 553 in a spaced apart manner to form an air gap 585 between the top surface 561 of the core layer 553 and the second surface 583 of the thermal layer 557. As is depicted in this embodiment, the air gap 585 is discontiguous within the peripheral edge 573 of the top frame layer 555, so that there are a plurality of air pockets 587 forming the air gap 585. The thermal layer 557 and the top frame layer 555 may be affixed to one another using any appropriate technique for a desired application while still remaining within the scope of the claims.

Both the first surface 581 and the second surface 583 of the thermal layer 557 are configured to serve as radiant thermal barriers, with each having a thermal emissivity of 0.5 or less, depending upon the type of material selected to form the respective the respective first and second surfaces 581, 583. As discussed above, the thermal layer 557 when having air space immediately adjacent both the first surface 581 and the second surface 583, serves as a bi-directional radiant thermal barrier when the ceiling system is installed into a building as described above.

The bottom layer 559 is positioned on the core layer 553, such that the bottom layer 559 has a first surface 591 facing away from the core layer 553 and an opposing second surface 593 facing toward the core layer 553. The bottom layer 559 may provide different acoustical or thermal insulation properties than the core layer 553 or other layers of the ceiling panel, and may be formed in a similar manner as described above in connection with the bottom layer 509 of FIG. 10. In certain embodiments, the core layer 553 may simply rest upon the bottom layer 559 when the ceiling panel 551 is placed within and supported by a support grid within an interior space within a building. In certain other embodiments, In the bottom layer 559 may be affixed to the core layer 553 by an appropriate adhesive or by fasteners.

Figure 14:
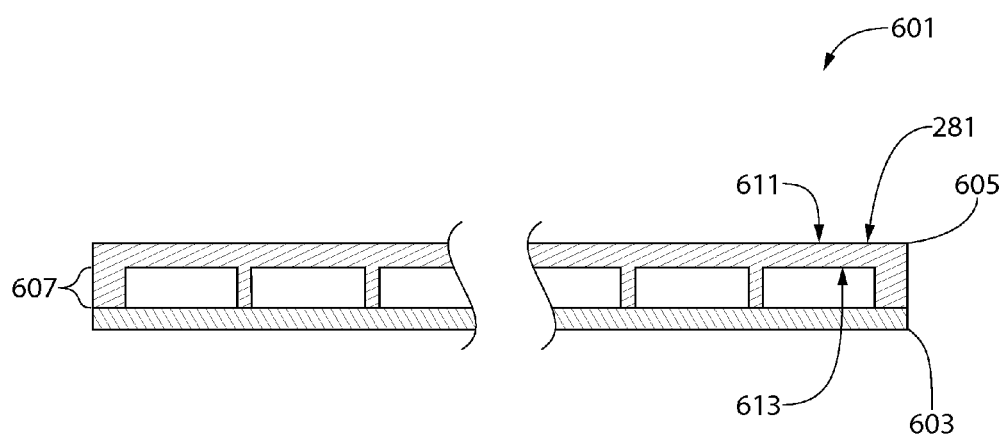
FIG. 14 is an exploded view of another embodiment of a ceiling panel.

FIG. 14 shows a cross sectional view of another exemplary embodiment of a ceiling panel 601 which includes a core layer 603 and a thermal layer 605. Both the core layer 603 and the thermal layer 605 may be formed from one or more sub-layers. In this embodiment, the thermal layer 605 includes a top surface 611 and a bottom surface 613, and the bottom surface 613 of the thermal layer 605 includes an integrally formed top frame layer 607 extending downward therefrom. The core layer 603 and the thermal layer 605 of this embodiment may otherwise be constructed in accordance with the respective layers discussed above.

FIG. 15 shows yet another embodiment of a ceiling panel 651, with this ceiling panel 651 being configured as a radiant heating or cooling panel. The ceiling panel 651 includes a core layer 653 having a top surface 655 and a bottom surface 657. When the ceiling panel 651 is placed within and supported by a support grid within an interior space within a building, the top surface 655 of the core layer 653 faces toward the upper interior space of the building. The ceiling panel 651 includes a coil layer 659 formed from piping 661 placed above the top surface 655 of the core layer 653. One or more additional layers 663 are included to separate the coil layer 659 from direct contact with the core layer 653. Radiant heating or cooling of the lower interior space of the building may be provided by the coil layer 659. A thermal layer 665 is positioned above the coil layer 653, so that the coil layer 653 creates an air gap adjacent the bottom surface 667 of the thermal layer 665. The air gap formed by the coil layer 653 enables the thermal layer 665 to provide a radiant thermal bather with both the bottom surface 667 and the top surface 669 in the manner described above with other embodiments. Moreover, by having the bottom surface 667 serve as a radiant thermal barrier, a lower amount of heating or cooling energy may be lost from the coil layer 653 up into the upper interior space of the building.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

While the foregoing description and drawings represent exemplary embodiments of the present disclosure, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made within the scope of the present disclosure. One skilled in the art will further appreciate that the embodiments may be used with many modifications of structure, arrangement, proportions, sizes, materials, and components and otherwise, used in the practice of the disclosure, which are particularly adapted to specific environments and operative requirements without departing from the principles described herein. The presently disclosed embodiments are therefore to be considered in all respects as illustrative and not restrictive. The appended claims should be construed broadly, to include other variants and embodiments of the disclosure, which may be made by those skilled in the art without departing from the scope and range of equivalents.

What is claimed is:

1. An acoustic ceiling panel comprising:
   a core layer having a top surface a bottom surface opposite the top surface, and a plurality of peripheral edges extending between the top and bottom surfaces, wherein the core layer comprises a sound absorption material having an NRC rating of at least 0.7;
   a top frame layer extending from the top surface of the core layer; and
   a thermal layer on the top frame layer, the thermal layer having a first surface and a second surface opposite the first surface, the first surface facing away from the top frame layer and the second surface facing toward the top frame layer,
   wherein the top frame layer supports the second surface of the thermal layer in a spaced-apart manner from the top surface of the core layer to form one or more air gaps between the top surface of the core layer and the second surface of the thermal layer, and
   wherein the first surface and the second surface of the thermal layer have a thermal emissivity of 0.5 or less.

2. The acoustic ceiling panel according to claim 1, wherein the first surface and the second surface of the thermal layer have a thermal emissivity of 0.1 or less.

3. The acoustic ceiling panel according to claim 1, wherein the top frame layer is formed by a plurality of ridges extending from the top surface of the core layer.

4. The acoustic ceiling panel according to claim 1, wherein the top frame layer is affixed to the top surface of the core layer.

5. The acoustic ceiling panel according to claim 1, wherein the top frame layer is formed integrally with the core layer.

6. The acoustic ceiling panel according to claim 1, wherein the top frame layer is formed integrally with the thermal layer.

7. The acoustic ceiling panel according to claim 1, wherein the first surface and the second surface of the thermal layer are formed from one of a metal foil, a paint, and a metal coated polymer film.

8. The acoustic ceiling panel according to claim 1, wherein the sound absorption material comprises a fibrous material.

9. The acoustic ceiling panel according to claim 8, wherein the fibrous material comprises mineral fiber.

10. An acoustic ceiling panel comprising
    a core layer having a top surface, a bottom surface opposite the top surface, and a plurality of peripheral edges extending between the top and bottom surfaces, wherein the core layer comprises a sound absorption material;
    a top frame layer extending from the top surface of the core layer; and
    a thermal layer on the top frame layer, the thermal layer having a first surface and a second opposite the first surface, the first surface facing away from the top frame layer and the second surface facing toward the top frame layer, wherein the top frame layer supports the second surface of the thermal layer in a spaced-apart manner from the top surface of the core layer to form one or more air gaps between the top surface of the core layer and the second surface of the thermal layer, and wherein the first surface and the second surface of the thermal layer have a thermal emissivity of 0.5 or less;
    wherein the top frame layer extends across the top surface of the core layer.

11. The acoustic ceiling panel according to claim 10, wherein the top frame layer includes at least one medial support extending across the top surface of the core layer.

12. The acoustic ceiling panel according to claim 10, wherein the thermal layer extends across the top frame layer to cover the top frame layer.

13. The acoustic ceiling panel according to claim 10, wherein the first surface and the second surface of the thermal layer have a thermal emissivity of 0.1 or less.

14. The acoustic ceiling panel according to claim 10, wherein the top frame layer is formed by a plurality of ridges extending from the top surface of the core layer.

15. The acoustic ceiling panel according to claim 10, wherein the top frame layer is affixed to the top surface of the core layer.

16. The acoustic ceiling panel according to claim 10, wherein the top frame layer is formed integrally with the core layer.

17. The acoustic ceiling panel according to claim 10, wherein the top frame layer is formed integrally with the thermal layer.

18. The acoustic ceiling panel according to claim 10, wherein the first surface and the second surface of the thermal layer are formed from one of a metal foil, a paint, and a metal coated polymer film.

19. An acoustic ceiling panel comprising:
a core layer having a top surface, a bottom surface opposite the top surface, and a plurality of peripheral edges extending between the top and bottom surfaces, wherein the core layer comprises a sound absorption material;
a top frame layer extending from the top surface of the core layer; and
a thermal layer on the top frame layer, the thermal layer having a first surface and a second opposite the first surface, the first surface facing away from the top frame layer and the second surface facing toward the top frame layer, wherein the top frame layer supports the second surface of the thermal layer in a spaced-apart manner from the top surface of the core layer to form one or more air gaps between the top surface of the core layer and the second surface of the thermal layer, and wherein the first surface and the second surface of the thermal layer have a thermal emissivity of 0.5 or less;
a bottom frame layer secured to the bottom surface of the core layer; and
a bottom layer secured to the bottom frame layer, wherein the bottom frame layer holds the bottom layer in a spaced-apart manner from the bottom surface of the core layer to form an air space between the bottom layer and the bottom surface of the core layer.

\* \* \* \* \*